Feb. 6, 1923.

A. C. DODGE

WEIGHING MACHINE

Filed Oct. 9, 1920

Inventor
Alfred C. Dodge
by his Attorney
John R. Nolan

Feb. 6, 1923.

A. C. DODGE

WEIGHING MACHINE

Filed Oct. 9, 1920    3 SHEETS-SHEET 3

1,444,337

Inventor
Alfred C. Dodge
by his Attorney
John F. Nolan

Patented Feb. 6, 1923.

1,444,337

UNITED STATES PATENT OFFICE.

ALFRED C. DODGE, OF YONKERS, NEW YORK.

WEIGHING MACHINE.

Application filed October 9, 1920. Serial No. 415,819.

*To all whom it may concern:*

Be it known that I, ALFRED C. DODGE, a citizen of the United States, and resident of Yonkers, in the county of Westchester and State of New York, have invented certain new and useful Improvements in Weighing Machines, of which the following is a specification.

This invention relates to weighing machines, and more especially to lever or beam scales of the general character illustrated in my Letters Patent of the United States No. 1,180,380, dated April 25, 1916, and No. 1,236,686, dated August 14, 1917, which patented scales comprise, amongst other things, a rotary longitudinally movable poise carrying fractional graduations, a fixed scale operatively associated therewith carrying unit graduations, and means carried by the beam for effecting and controlling the movements of the poise, as will more fully appear by reference to said Letters Patent.

The present invention comprises certain improvements in the patented scales with the object of simplifying and modifying the construction and arrangement of their component parts in such a manner as to ensure greater facility and accuracy of operation than heretofore, and at the same time to reduce the cost of manufacture and to improve the appearance of the machine in several particulars.

The said improvements, generally stated, concern adjustable connections for effecting and ensuring the accurate positioning of the material suporting devices carried by the beam; novel mechanism for operating and controlling the graduated poise on the beam; and novel means for supporting a supplemental weight in co-operative relation to the coupling devices therefor on the beam; all of which will be hereinafter fully described, and the scope of the invention then be defined in the appended claims.

In the drawings—

Figure 1:
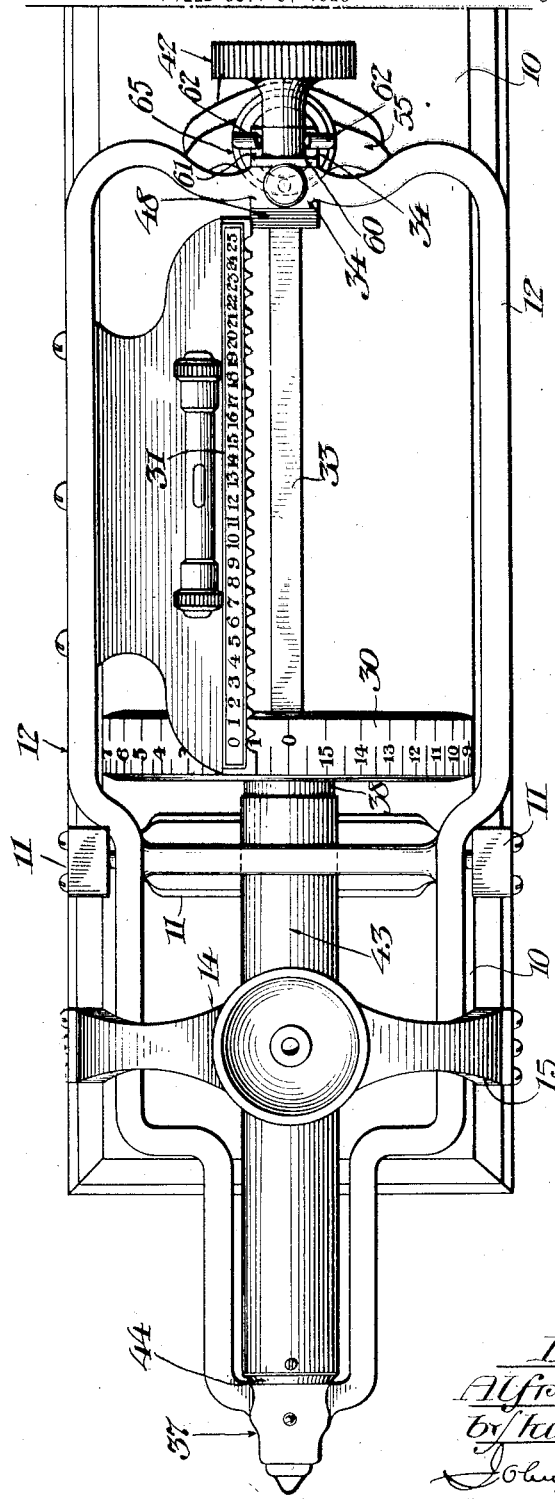
Figure 1 is a plan view of a weighing machine embodying my invention, the bed for the material support being omitted.
Figure 2:
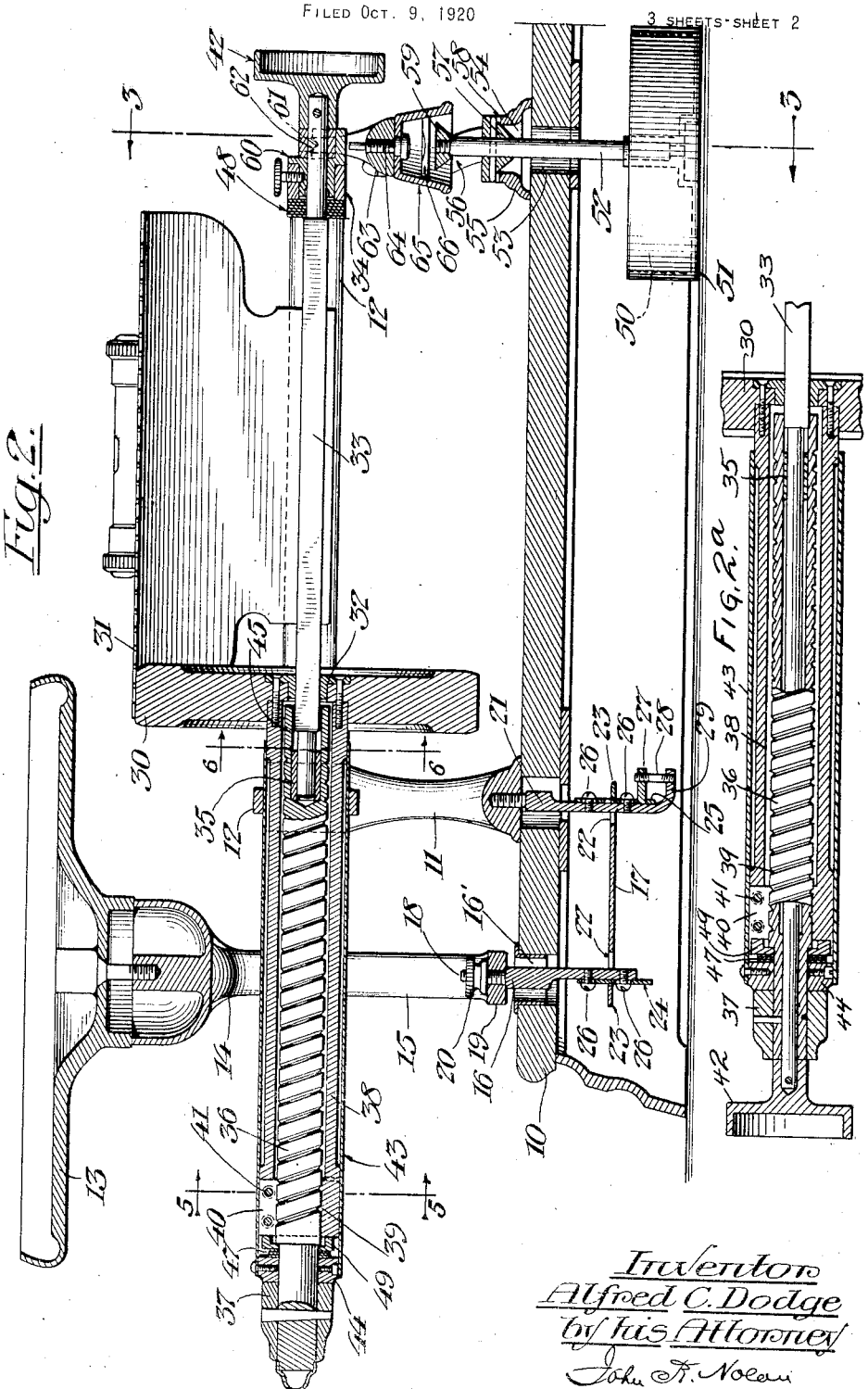
Fig. 2 is a longitudinal vertical section thereof, said bed being shown.

Fig. 2ª is a similar section through a modified form of the screw shaft and adjuncts.

Figure 3:
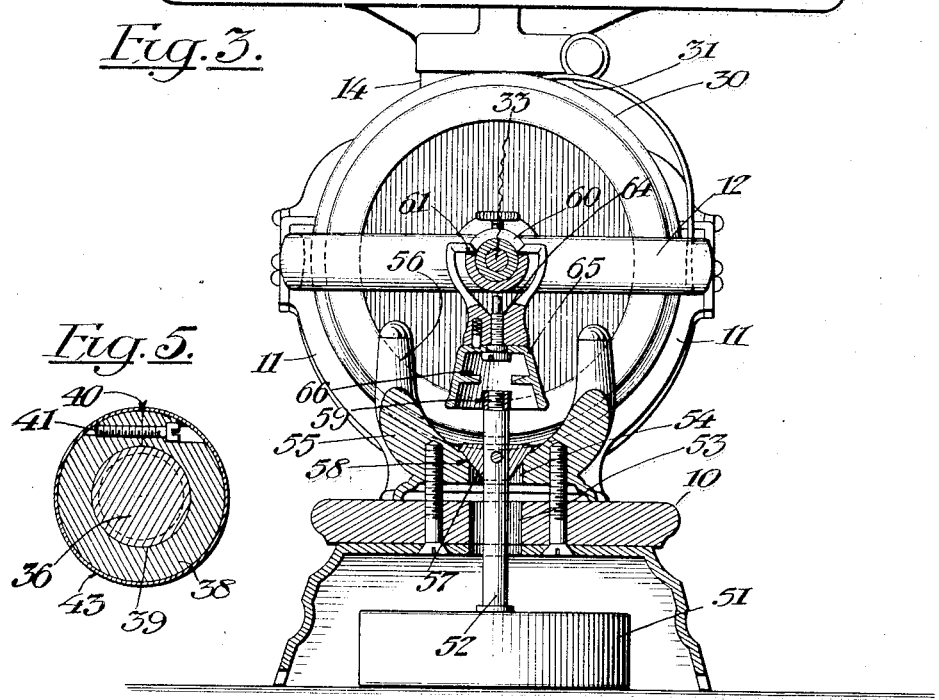

Fig. 3 is a transverse vertical section of the machine, as on the line 3—3 of Fig. 2.

Figure 4:
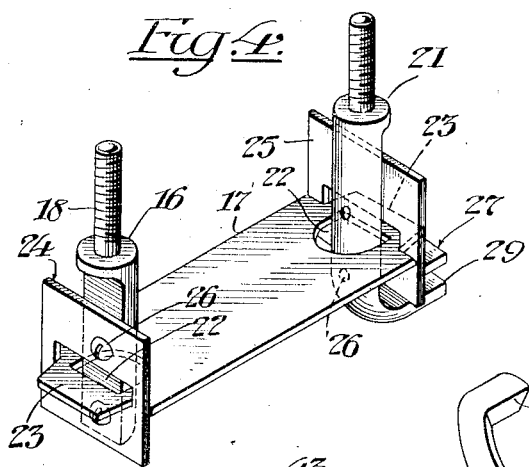

Fig. 4 is a perspective view of the equalizing connection for the frame structure of the material support.

Figure 5:
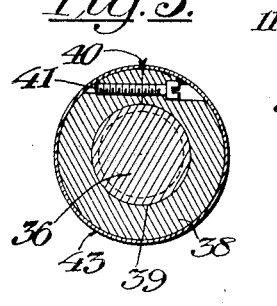

Fig. 5 is a transverse section through the screw-shaft, the co-operating nut therefor, and adjuncts, as on the line 5—5 of Fig. 2.

Figure 6:
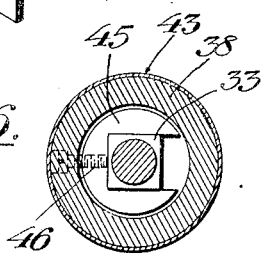

Fig. 6 is a similar section through the spindle and poise sleeve, showing an adjustable friction member.

Figure 7:
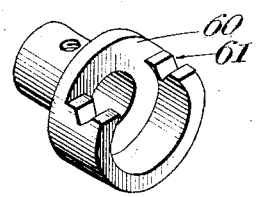
Figure 8:
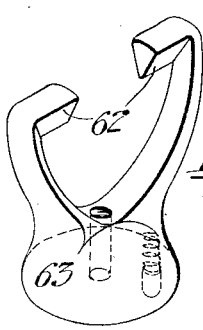

Figs. 7 and 8 are perspective views of associated pivot members hereinafter described for supporting the coupling device for a supplemental weight.

Referring to the drawings, 10 designates a base, 11 a standard thereon, and 12 an oscillatory beam pivotally mounted on said standard and equipped with a suitable support for the material to be weighed. This support comprises a bed 13 carried by a frame structure 14 which is pivotally connected with the beam.

The structure 14 includes a hanger portion 15 provided at its lower end with a rod 16 which depends through a suitable opening 16′ into the interior of the base. An upstanding threaded portion 18 of the rod 16 projects through the apertured lower member 19 of the hanger and is provided with a clamp-nut 20 whereby the said rod and hanger can be securely, yet detachably, connected.

The lower portion of the rod 16 is flexibly connected by means of an equalizing link 17 with a fixture, as the rod 21, depending from the standard 11 down into the base, which link is constructed and designed to permit and insure accurate perpendicular motion of the frame structure 14. To this end, the link is constituted by a plate having adjacent its ends openings 22 through which the respective rods 16, 21 freely extend, and having also end tongues 23 which loosely project through slotted plates 24, 25 secured to the adjacent rods by suitably-disposed screws 26. The holes for the screws are vertically elongated in order to permit limited vertical adjustment of the respective plates 24, 25 on the rods. The plate 25 is preferably provided with a laterally projecting lug 27 having a threaded opening to receive the upper portion of a vertical set-screw 28, the lower portion of which is reversely threaded and mounted in a laterally projecting foot 29 formed on the rod 21. By the construction just described it will be seen that when the link and its end plates are assembled, any imperfection of adjustment of the link can be readily corrected by releasing the screws 26 for the plate 25 and then manipulating the set-screw 28 to effect the accurate vertical adjustment of the pivotal connection of the link with said plate. This being done the screws 26 for the plate 25 are tightened. (See Figs. 2 and 4).

The poise 30 is mounted upon the scale beam 12 so as to have capacity for rotary and longitudinal movement thereon, and is provided with peripheral graduations and characters, constituting a "fractional scale" (designating ounces, for example) adapted to co-operate in the usual manner with unit (or pound) graduations, or characters, upon the relatively fixed scale member 31.

The poise is provided with a central bushing 32 having a polygonal aperture which is slidably mounted upon a rotary spindle 33, of polygonal cross-section, extending longitudinally of the beam. That end of this spindle remote from the material support is journaled in a suitable bearing 34 on the beam, and the other end of the spindle is journaled in a bearing socket 35 in the inner end of a stationary externally-threaded shaft 36. This shaft is in axial alinement with the spindle; the outer end of the former being fixedly supported in a bearing 37 on the adjacent end of the beam.

Fastened to the poise 30 is a relatively long sleeve 38 which encircles the screw shaft 36 and is movable longitudinally thereof. The outer end of this sleeve comprises an internally threaded portion 39 which engages the thread of the shaft similarly to a nut, and is adapted by manual rotation of the spindle to travel throughout substantially the length of said shaft, and thus propel the poise longitudinally of the spindle 33 and into co-operative relation with the fixed scale member 31. Preferably the nut portion 39 comprises an internally threaded extension of the sleeve 38, which extension is longitudinally split at one side, as at 40, and has its opposing edges adjustably connected by screws 41 whereby the action of the nut upon the screw shaft can be nicely regulated. (See Figs. 2 and 5.)

The outer end of the spindle 33 is provided with a hand wheel 42, by the rotation of which the said spindle, together with the poise and its appurtenances, can be conveniently rotated in order to effect precise rotary and longitudinal adjustment of the poise in relation to the fixed scale member 31.

Encasing the sleeve 38 is a tubular sheath 43 which is fixed at its outer end to a collar 44 on the shaft 36 and is supported at its inner end in a cross-bar of the scale beam. The relative construction and arrangement of the movable sleeve and relatively stationary sheath are such that the sleeve telescopes with the sheath and is thereby supported and guided during the entire longitudinal travel of the sleeve and the poise, as above mentioned.

The novel supporting and operating mechanism above described for the poise and its adjuncts can be readily and economically constructed and assembled; facility and accuracy of operation and registry are ensured; the screw elements are concealed and protected, and altogether an efficient and attractive structure is provided.

If desired the screw-shaft 36 may be a tubular element, and the inner journal of the spindle 33 may be extended therethrough and provided at its outer end with a hand wheel similar to the wheel 42 at the opposite ends of the spindle. See Fig. 2$^a$.

In order to regulate the tension of the poise on the spindle 33, as occasion may require, I preferably secure within that end of the sleeve 38 adjacent the poise, a saddle-shaped friction member 45 which slidably straddles the spindle. This member is secured to the sleeve by means of a set-screw 46, by the manipulation of which the member can be nicely adjusted to bear with more or less force on the opposing surface of the spindle. This friction member being fast to the sleeve 38 travels longitudinally of the spindle concurrently with the poise. (See Fig. 6.)

On the shaft 36 and spindle 33, adjacent their outer ends, are sets of metal shims 47, 48, respectively, which determine to a nicety the extreme limits of longitudinal travel of the poise. One set (47) of the shims is fitted upon the shaft 36 between the collar 44 and a spaced collar 49 on the shaft, and the other set 48 is applied to the outer journal extension of the spindle between the squared or shouldered portion of the latter and the adjacent bearing 34. It is important that these shims be of metal, such as brass, in order that they shall afford positive and reliable abutments.

A supplemental weight 50 is adapted to be operatively connected to the outer end of the beam preliminary to weighing a load above a known quantity. This weight is contained in a receptacle 51 fast on the lower end of a vertical rod 52 which extends freely through an opening 53 in the base 10, and also through a central opening 54 in the fixture 55 from which the abutment posts 56 for the scale beam extend. On the body of the rod 52 is fixed a conical collar 57 which is so positioned that when it is seated in the beveled upper edge 58 of the opening 53, the weighted rod 52 is maintained in vertical position. When the weight 50 is not in actual service the collar 57 rests upon the beveled seat 58 in the fixture 55. The rod is provided with a T-head 59.

Secured to the bearing 34 on the beam 12 is a bushing member 60 having appropriate seats 61 for knife edges 62 formed on the limbs of a depending yoke 63. This yoke rotatably supports, as by a pivot screw 64, a bell-shaped coupling member 65 having within it a slotted horizontal partition 66. The mouth of the member 65 is so disposed as to encase the T-head of the rod 52. When it is desired to connect the supplemental weight to the scale beam, the end of the beam carrying the coupling member 65 is lowered, and such member is partially turned on its axis so as to aline its internal slot with the T-head of the rod 52. The slot is then brought into registry with and below the T-head, and the coupling member is turned in a manner to engage its partition with the bottom of the T-head, thereby effecting a reliable connection between the rod and the scale beam. To disconnect the weight 50 from the beam it is merely necessary to turn the coupling member sufficiently to locate the slot in alinement with the T-head, whereupon the weight 50 drops and the conical collar 57 becomes centrally seated in the guide opening of the fixture 55, as above mentioned.

By the construction and arrangement of parts just described the rod for the supplemental weight has ample capacity for lateral movement while in service, and yet the accurate vertical disposition of the rod to permit its ready connection with the coupling member, is ensured.

It is to be understood that I do not limit myself to the specific details of construction herein disclosed, as the mechanism may be modified in various respects within the principle of the invention and the scope of the appended claims.

I claim—

1. In a weighing machine, the combination with a base, a beam mounted to oscillate above said base, and a poise on said beam, of a material support including an element pivotally connected to the beam and having a depending portion, a fixture in spaced relation to said depending portion and having a laterally-projecting foot with a threaded opening therein, vertically adjustable pivot bearings on said depending portion and fixture, and a link pivotally supported at its ends in said bearings, the pivot bearing on said fixture comprising a vertically adjustable plate having a laterally-projecting lug with a threaded opening therein in alinement with the opening in the said foot, and a set-screw fitted in the two openings.

2. In a weighing machine, the combination with a base, a beam mounted to oscillate above said base, and a poise on said beam, of a material support including an element pivotally connected to the beam and having a depending portion, a fixture in spaced relation to said depending portion, slotted bearing plates on said depending portion and fixture, means for adjustably securing said plates in place, and a link having openings for the passage of said portion and fixture and having also end tongues which loosely enter the slots of the respective plates.

3. In a weighing machine, the combination of a support for the material to be weighed, a beam for said support, an externally threaded shaft fixed on the beam, a spindle in axial alinement with the shaft, a poise mounted on said spindle for rotary and longitudinal movement thereon, and a sleeve fast to said poise and encircling the screw-shaft, said sleeve having a nut portion in registry with the thread of the screw-shaft.

4. In a weighing machine, the combination of a support for the material to be weighed, a beam for said support, an externally screw-threaded shaft fixed on the beam, a spindle in axial alinement with the shaft, a poise mounted on said spindle for rotary and longitudinal movement thereon, and a sleeve encircling said screw-shaft, said sleeve having one end thereof affixed to the poise and having its opposite end internally threaded for engagement with the thread of the screw-shaft.

5. In a weighing machine, the combination of a support for the material to be weighed, a beam for said support, an externally screw-threaded shaft fixed on the beam, a spindle in axial alinement with the shaft, a poise mounted on said spindle for rotary and longitudinal movement thereon, and a sleeve encircling said screw-shaft, said sleeve having one end thereof affixed to the poise and having its opposite end longitudinally split and internally threaded for engagement with the thread of the screw-shaft, together with adjusting means for the split end of the sleeve.

6. In a weighing machine, the combination of a support for the material to be weighed, a beam for said support, an externally screw-threaded shaft fixed on the beam, a spindle in axial alinement with the shaft, a poise mounted on said spindle for rotary and longitudinal movement thereon, a sleeve fast to said poise and encircling the screw-shaft, said sleeve having a nut portion in registry with the thread of the screw-shaft, and a guide sheath fast on said beam and encasing the said sleeve.

7. In a weighing machine, the combination of a support for the material to be weighed, a beam for said support, an externally screw-threaded shaft fixed on the beam, a spindle in axial alinement with the shaft, a poise mounted on said spindle for rotary and longitudinal movement thereon, a sleeve fast to said poise and encircling the screw-shaft, said sleeve having a nut portion in registry with the thread of the screw-shaft, and sets of metal shims on said shaft and spindle constructed and arranged to provide limiting stops for the said poise and sleeve.

8. In a weighing machine, the combination of a support for the material to be weighed, a beam for said support, an externally screw-threaded shaft fixed on the beam, a spindle in axial alinement with the shaft, a poise mounted on said spindle for rotary and longitudinal movement thereon, a sleeve fast to said poise and encircling the screw-shaft, said sleeve having a nut portion in registry with the thread of the screw-shaft, a friction member bearing on the spindle, and an adjustable connection between said member and the said sleeve.

9. In a weighing machine having an oscillatory beam, the combination with said beam, of a supplementary weight, a suspension rod therefor having spaced apart coupling and centralizing members, a fixed centralizing member with which the centralizing member on the rod is adapted to register, and a coupling member suspended from the beam and adapted to co-operate with the coupling member on the said rod.

10. In a weighing machine having an oscillatory beam, the combination with said beam, of a supplementary weight, a suspension rod therefor having a T-head at its upper end, and having a conical member below said head, a fixture having a vertical aperture through which the rod freely extends, the mouth of said aperture being beveled correspondingly with the conical member, and a coupling member suspended from the beam and having a slotted portion adapted to be detachably connected with the T-head of the said suspension rod.

Signed at New York in the county and State of New York this 8th day of October A. D. 1920.

ALFRED C. DODGE.